United States Patent
Sato (10) Patent No.: US 11,199,806 B2
(45) Date of Patent: Dec. 14, 2021

(54) IMAGE FORMING APPARATUS HAVING ROTATABLE ORIGINAL READING PORTION AND COVER MEMBER

(71) Applicant: CANON KABUSHIKI KAISHA, Tokyo (JP)

(72) Inventor: Masaki Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/158,887

(22) Filed: Jan. 26, 2021

(65) Prior Publication Data

US 2021/0240128 A1 Aug. 5, 2021

(30) Foreign Application Priority Data

Jan. 30, 2020 (JP) .............................. JP2020-014168

(51) Int. Cl.
*G03G 21/00* (2006.01)
*G03G 21/16* (2006.01)

(52) U.S. Cl.
CPC ..... *G03G 21/1633* (2013.01); *G03G 21/1619* (2013.01); *G03G 2215/0132* (2013.01); *G03G 2221/1687* (2013.01)

(58) Field of Classification Search
CPC ........... G03G 21/1633; G03G 21/1628; G03G 21/1666; G03G 2221/1636; G03G 2221/1687
USPC ................. 399/110, 118, 125; 358/496, 497
See application file for complete search history.

(56) References Cited

U.S. PATENT DOCUMENTS

| | | | | |
|---|---|---|---|---|
| 6,510,301 B2 * | 1/2003 | Tanaka | ................. | G03G 15/605 399/125 |
| 7,133,626 B2 * | 11/2006 | Kaiga | ...................... | G03G 7/00 399/110 |
| 8,514,464 B2 * | 8/2013 | Takamura | .......... | H04N 1/00543 358/474 |
| 8,605,300 B2 * | 12/2013 | Nagasgima | ........ | H04N 1/00543 358/1.13 |
| 8,681,394 B2 * | 3/2014 | Ikebata | ............. | G03G 15/0894 358/474 |
| 8,744,305 B2 * | 6/2014 | Niikawa | ............ | G03G 21/1628 399/110 |
| 9,083,831 B2 * | 7/2015 | Niikawa | .............. | G03G 15/605 |

(Continued)

FOREIGN PATENT DOCUMENTS

JP 2011-137994 7/2011

*Primary Examiner* — Robert B Beatty
(74) *Attorney, Agent, or Firm* — Venable LLP (57) ABSTRACT

An image forming apparatus includes an image forming portion provided with an opening portion through which a cartridge is removably mounted and a cover member opening and closing the opening portion. An original reading portion is pivotable about a first rotation axis. The cover member is pivotable about a second rotation axis parallel to the first rotation axis. A force is applied to pivot the original reading portion so that an engagement portion of the original reading portion slides on a sliding face of the cover member to apply a force from the engagement portion to the sliding face to pivot the cover member. In a cross section orthogonal to the first rotation axis, a first portion of the sliding face approaches the original reading portion from one end side on which the first and the second rotation axes are provided toward an opposite side.

12 Claims, 6 Drawing Sheets

(56) References Cited

U.S. PATENT DOCUMENTS

| | | | |
|---|---|---|---|
| 2006/0051125 A1* | 3/2006 | Nakayama | G03G 21/1638 399/110 |
| 2007/0098440 A1* | 5/2007 | Ikebata | G03G 21/1628 399/119 |
| 2011/0134455 A1 | 6/2011 | Nagashima et al. | G06F 3/12 |

* cited by examiner

IMAGE FORMING APPARATUS HAVING ROTATABLE ORIGINAL READING PORTION AND COVER MEMBER

BACKGROUND OF THE INVENTION

Field of the Invention

The present invention relates to an image forming apparatus, and more particularly, to an image forming apparatus including an image reading portion provided above an image forming portion.

Description of the Related Art

Hitherto, there have been known small-sized and middle-sized image forming apparatus including: an image reading portion provided above an image forming portion; and a stacking portion, which is provided between the image forming portion and the image reading portion, and is configured to stack discharged recording sheets. In such an image forming apparatus, in order to perform, for example, handling of paper jam or maintenance such as inner cleaning and replacement of consumable parts in the image forming portion, an opening mechanism for allowing access to the inside of the image forming portion is required.

Therefore, there has been proposed a system of opening and closing an upper cover member provided at an upper portion of the image forming portion while sufficiently securing a space between the image forming portion and the image reading portion. Further, there has been proposed an image forming apparatus in which an image reading portion and an upper cover member provided at an upper portion of an image forming portion are pivotably supported on a main body of the image forming portion, and a rail member formed on a lower face of the image reading portion and the upper cover member are coupled to each other (see, for example, Japanese Patent Application Laid-Open No. 2011-137994). In such an image forming apparatus, the upper cover member is opened and closed in association with an opening and closing operation of the image reading portion, thereby opening the inside of the image forming portion. With this, the opening and closing mechanism of the related-art image forming apparatus allows easy access to an inside of the apparatus main body.

However, in the related-art technology, the image reading portion is moved in association with the opening and closing operation of the upper cover member for the image reading portion. Accordingly, the weight of members to be lifted at the same time is increased, and a force required for lifting the members is increased. Thus, there is a problem in usability. In particular, a load acting at a position corresponding to the start of opening, that is, at the initial operation at which the force required for lifting the image reading portion is the largest is increased.

SUMMARY OF THE INVENTION

The present invention has been made under such circumstances, and has an object to reduce a load acting at a position corresponding to the start of opening at which a force required for lifting an upper cover member (cover member) and an image reading portion (original reading portion) is the largest at the time of accessing an inside of an image forming portion, thereby improving usability.

In order to achieve the above-mentioned object, according to an embodiment of the present invention, there is provided an image forming apparatus, comprising: an image forming portion, which includes a cartridge, and is configured to form an image on a recording material with developer; and an original reading portion, which is provided above the image forming portion, and is pivotable about a first rotation axis, wherein the image forming portion includes an opening portion through which cartridge is removably mounted to the image forming portion from above, and a cover member, which is pivotable about a second rotation axis parallel to the first rotation axis, and is configured to assume an open state in which the opening portion is opened and a closed state in which the opening portion is closed, wherein the original reading portion includes an engagement portion, and the cover member includes a sliding face, wherein a force is applied to the original reading portion to cause the original reading portion to pivot so that the engagement portion slides on the sliding face to apply a force from the engagement portion to the cover member through the sliding face to cause the cover member to pivot, and wherein the sliding face includes a first portion, and in a cross section orthogonal to the first rotation axis, the first portion approaches the original reading portion from one end side of the image forming apparatus on which the first rotation axis and the second rotation axis are provided toward an opposite side opposed to the one end side.

Further features of the present invention will become apparent from the following description of exemplary embodiments with reference to the attached drawings.

DESCRIPTION OF THE EMBODIMENTS

Modes for carrying out the present invention are described below in detail based on embodiments with reference to the drawings.

First Embodiment

Now, an overall configuration of an image forming apparatus, a coupling structure between a scanner (original reading portion) and an upper cover member (cover member), and an opening and closing operation of the scanner and the upper cover member are described in the stated order. Here, a laser beam printer is described as an example of the image forming apparatus.

[Overall Configuration of Image Forming Apparatus]

Figure 1A:
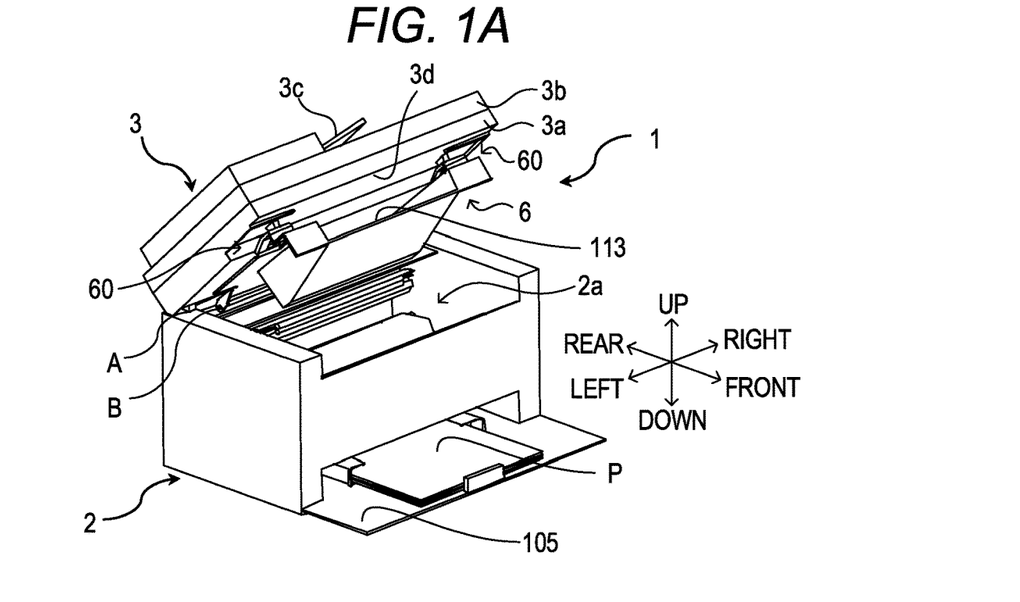
FIG. 1A is a perspective view of a multifunction peripheral.
Figure 1B:
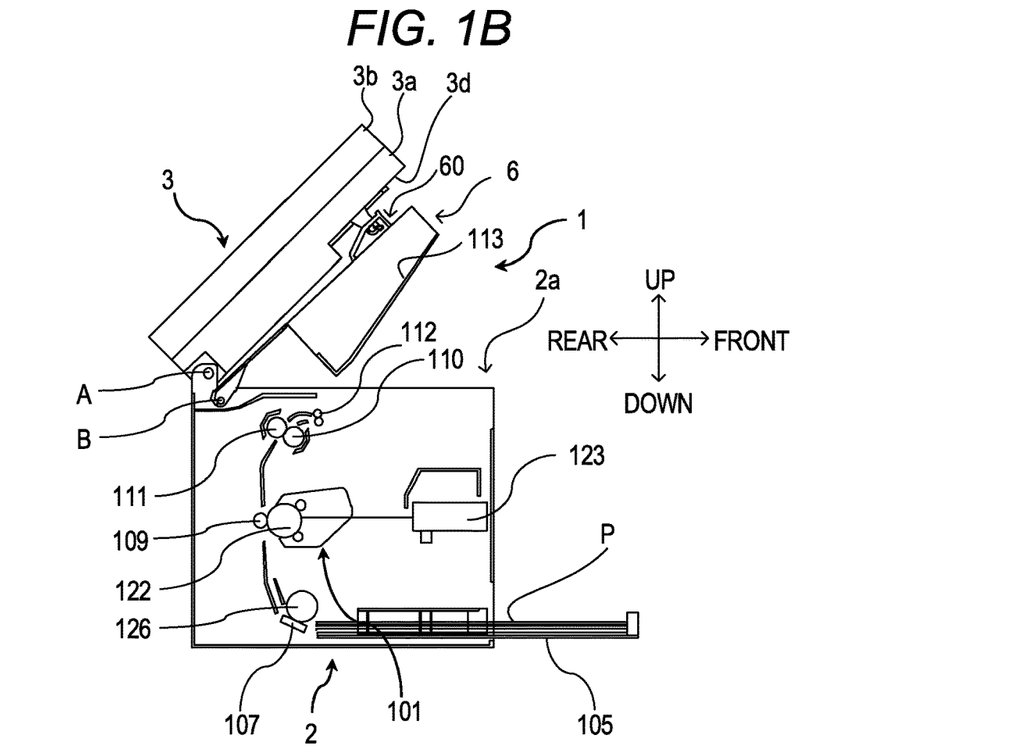
FIG. 1B is a sectional view of an internal structure of a printer.

An image forming apparatus according to a first embodiment is described. FIG. 1A and FIG. 1B are illustrations of the image forming apparatus (hereinafter referred to as "multifunction peripheral 1") including an image reading portion (hereinafter referred to as "scanner 3") provided above an image forming portion (hereinafter referred to as "printer 2"). FIG. 1A is a perspective view of the multifunction peripheral 1. FIG. 1B is a sectional view of an internal structure of the printer 2. A front-and-rear direction, a right-and-left direction, and an up-and-down direction of the multifunction peripheral 1 are indicated by arrows in FIG. 1A. Further, a front side of the multifunction peripheral 1 is also referred to as "front side", and a rear side of the multifunction peripheral 1 is also referred to as "rear side".

As illustrated in FIG. 1A, the multifunction peripheral 1 mainly includes the printer 2 and the scanner 3. The scanner 3 includes an original table 3a on which an original is placed, an original-table upper cover 3b, and an automatic original feeding portion 3c. In drawings subsequent to FIG. 1B, illustration of the automatic original feeding portion 3c is omitted. The scanner 3 is located above the printer 2, and a discharge stacking portion 113 being a discharge portion of the printer 2 is arranged between the scanner 3 and the printer 2 in the up-and-down direction.

Figure 2A:
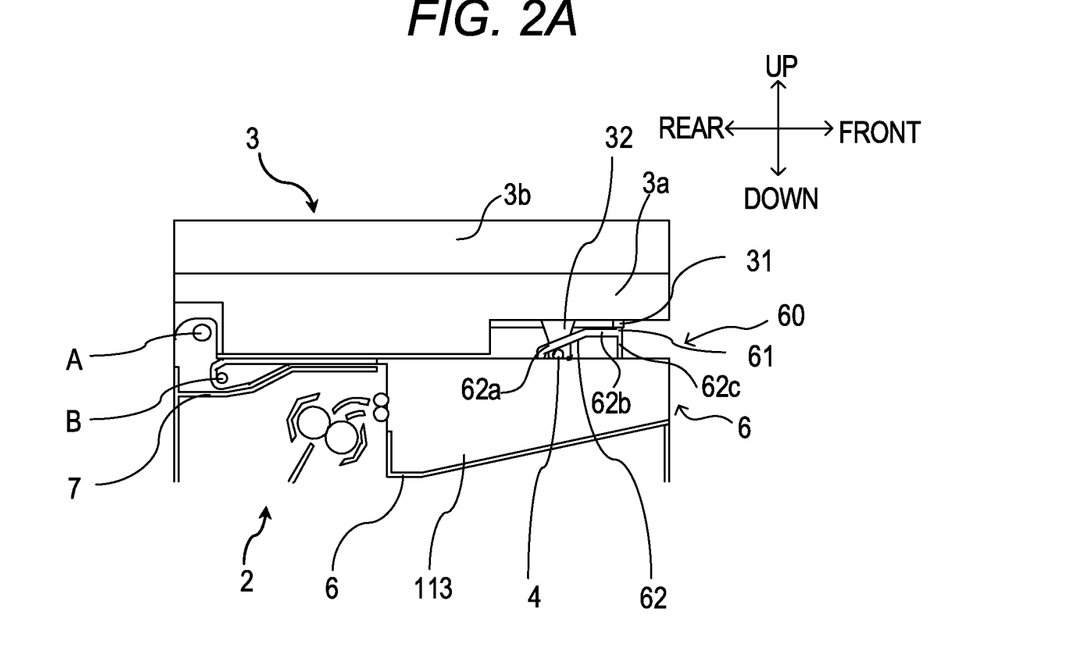
FIG. 2A is a sectional view of a coupling portion in a closed state in a first embodiment.

The multifunction peripheral 1 is configured to take a closed state being a first state and an open state being a second state. The closed state being the first state is a state in which an opening 2a (opening portion) of the printer 2 is covered by an upper cover member 6 and is closed (FIG. 2A). Meanwhile, the open state being the second state is a state in which one end of the scanner 3 being the original reading portion of the multifunction peripheral 1 and one end of the upper cover member 6 being a cover member are moved upward to open the opening 2a of the printer 2 (FIG. 1A). That is, in the open state, a process cartridge 101 accommodated inside the printer 2 can be visually recognized through the opening 2a, and access to the process cartridge 101 is available.

(Scanner)

The scanner 3 is mounted to the printer 2 such that the scanner 3 is pivotable about a pivotal center axis A being a first rotation axis provided on the rear side. The scanner 3 is configured to be opened from the closed state by a predetermined angle in accordance with the weight and the position of the gravity center of the scanner 3 and the printer 2. For example, the scanner 3 can be opened from the closed state by an angle of 45° to 50°. In the closed state, the scanner 3 is supported while being coupled to the printer 2 by a support member (not shown) on the front side. A portion 3d is a portion on a front side of a face of the original table 3a, which is opposed to the discharge stacking portion 113, and a user puts a hand on, for example, the portion 3d and lifts the scanner 3 to bring the multifunction peripheral 1 into the open state. The scanner 3 is, for example, a publicly-known flat-bed scanner. An internal structure of the scanner 3 is the same as that of a related-art flat-bed scanner, and hence description thereof is omitted.

(Printer)

Next, the internal structure of the printer 2 is described. As illustrated in FIG. 1B, the printer 2 is a laser printer which is configured to, with the process cartridge 101 mounted thereto, form a toner image by an electrophotographic system and record the toner image on a sheet P being a recording material. The printer 2 is configured to perform, for example, monochrome printing. The process cartridge 101 is mountable and removable from above the opening 2a. In the process cartridge 101, a photosensitive drum 122 being an image bearing member is rotatably provided inside a housing, and light in accordance with image information is radiated onto a charged surface of the photosensitive drum 122, thereby forming a latent image. The latent image formed on the photosensitive drum 122 is developed with toner (developer) to form a toner image, and the formed toner image is transferred onto the sheet P. In the printer 2, a laser scanner unit 123 configured to irradiate the photosensitive drum 122 with light is provided. Further, sheets P accommodated in a sheet feeding cassette 105 are separated one by one by a feeding roller 126 and a sheet separation portion 107 and fed to a conveyance path based on a print signal sent from a host computer (not shown). The separated sheets P are conveyed to a transfer nip portion formed by the photosensitive drum 122 and a transfer roller 109 in pressure contact with the photosensitive drum 122.

Meanwhile, the laser scanner unit 123 irradiates the photosensitive drum 122 with light based on image information sent from the host computer to form a latent image in accordance with the image information. The latent image formed on the photosensitive drum 122 is developed with toner to be visualized as a toner image, and the toner image is transferred onto the sheet P in the transfer nip portion. The sheet P having the unfixed toner image transferred thereon is conveyed to a fixing nip portion formed by a fixing film 110 and a pressure roller 111 in pressure contact with the fixing film 110, and the toner image is fixed. The sheet P having the toner image fixed thereon is conveyed by a discharge roller pair 112, and is discharged to the discharge stacking portion 113 provided in an upper portion of the printer 2.

The printer 2 accommodates each part described above inside the housing, and the opening 2a is provided on the scanner 3 side (original reading portion side), that is, in the upper portion of the printer 2. A user can access the inside of the printer 2 under a state in which the opening 2a is opened. A user can, for example, mount or remove the process cartridge 101 or eliminate paper jam of the sheet P (jam handling) by opening the opening 2a. The multifunction peripheral 1 includes the upper cover member 6 for covering the opening 2a, and a part of the upper cover member 6 is the discharge stacking portion 113. The upper cover member 6 is mounted so as to be pivotable about a pivotal center axis B being a second rotation axis provided on the rear side of the printer 2. Here, the pivotal center axis A of the scanner 3 and the pivotal center axis B of the upper cover member 6 are both provided on the rear side, but are provided at different positions in the front-and-rear direction. The pivotal center axis A of the scanner 3 is provided at a position farther apart from the front side than the pivotal center axis B of the upper cover member 6.

(Coupling Portion)

The multifunction peripheral 1 includes coupling portions 60. The coupling portions 60 couple the scanner 3 and the upper cover member 6 as follows. Specifically, the scanner 3 is caused to pivot about the pivotal center axis A such that the front side of the scanner 3 is moved upward, and the upper cover member 6 is caused to pivot about the pivotal center axis B in association with such an operation to bring the upper cover member 6 into the open state. For example, as illustrated in FIG. 1A, the coupling portions 60 are provided at a left end portion and a right end portion of the scanner 3 and the upper cover member 6. The coupling portion 60 may be provided at one position, or the coupling portions 60 may be provided at a plurality of positions, specifically, three or more positions.

[Coupling Structure Between Scanner and Upper Cover Member]

Figure 2B:
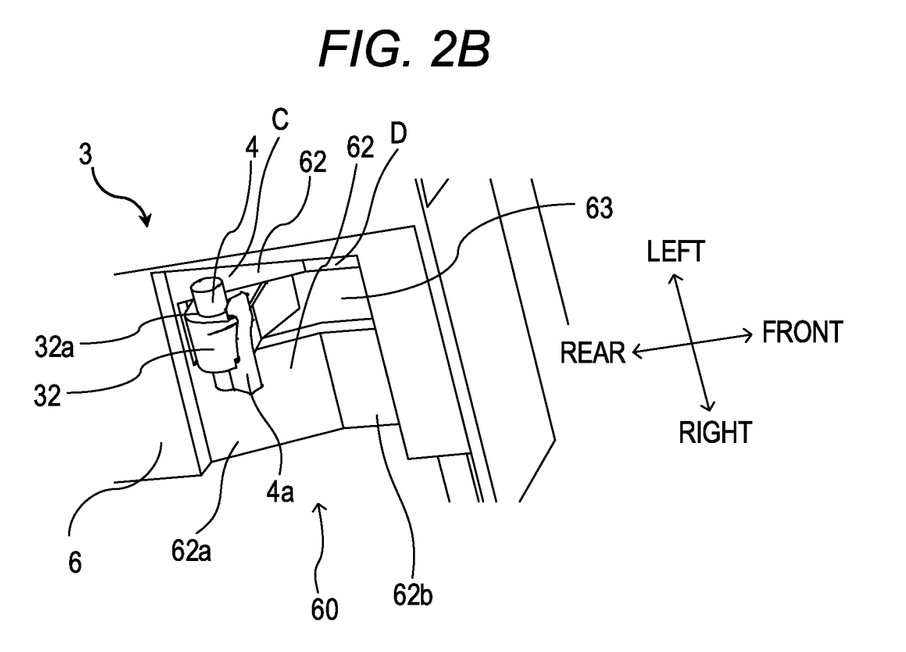
FIG. 2B is a perspective view of the coupling portion in the closed state in the first embodiment.

With reference to FIG. 2A and FIG. 2B, the coupling portions 60 between the scanner 3 and the upper cover member 6 are described. FIG. 2A is a sectional view for illustrating the coupling portion 60 in the closed state in which the scanner 3 takes a closed position, and the upper cover member 6 covers the opening 2a. FIG. 2B is a perspective view for illustrating main parts of the coupling structure during the closed state. As illustrated in FIG. 2A, the discharge stacking portion 113 is provided to the upper cover member 6 as a part of the housing of the printer 2. Further, the upper cover member 6 is provided so as to be openable and closable by pivoting about the pivotal center axis B with respect to a frame body 7 of the printer 2. Access to the inside of the printer 2 is available in such a manner that the upper cover member 6 is lifted and caused to pivot toward the upper side with respect to the main body of the printer 2 to open the opening 2a. A stopper (not shown) is provided in the vicinity of the pivotal center axis B of the upper cover member 6. In order to maintain the open state when the upper cover member 6 is brought into the open state, the stopper is locked when the upper cover member 6 pivots by a predetermined angle to be brought into the open state. The pivotal center axis B of the upper cover member 6 is arranged at a distance from the pivotal center axis A of the scanner 3 in a pivoting direction of the scanner 3.

In the scanner 3, abutment portions 31 each being a first abutment portion are formed on a lower face of the original table 3a. Meanwhile, abutment portions 61 each being a second abutment portion are formed on an upper face of the upper cover member 6. When the upper cover member 6 is in the closed state, the abutment portions 31 of the scanner 3 and the abutment portions 61 of the upper cover member 6 are brought into abutment against each other. At this time, the printer 2 is configured so as to be capable of preventing the upper cover member 6 from being lifted and opened unintentionally during an operation of the multifunction peripheral 1 (for example, during printing). In the locked state of the stopper (not shown) in the closed state, the stopper is locked to such a degree that a user can unlock the stopper by a force of pushing up the upper cover member 6 so as to bring the upper cover member 6 into the open state.

With reference to FIG. 2B, the coupling portion 60 is described in detail. The coupling portion 60 includes a link portion 32 and a rail portion 62. The link portion 32 is an engagement portion provided to the scanner 3. The rail portion 62 is provided to the upper cover member 6. The rail portion 62 having a sloped cam shape is formed on the upper face of the upper cover member 6, and a hole portion 63 is formed in a part of the rail portion 62. Meanwhile, the link portion 32 having a pin hole portion 32a at a distal end and protruding toward the upper cover member 6 is formed on a lower face of the scanner 3 (original table 3a). The distal end of the link portion 32 of the scanner 3 is inserted through the hole portion 63 formed in the rail portion 62 of the upper cover member 6. A link pin 4 is inserted through the pin hole portion 32a of the link portion 32. A pin regulation portion 4a that regulates coming off and loosening of the link pin 4 is fitted to the link portion 32. With this, the scanner 3 and the upper cover member 6 are coupled to each other. The scanner 3 and the upper cover member 6 are coupled to each other by the coupling portions 60, and the upper cover member 6 also pivots in association with the opening and closing operation of the scanner 3.

The rail portion 62 of the upper cover member 6 includes a first portion 62a, a second portion 62b, and a regulation portion 62c (FIG. 2A). A lower face of the first portion 62a (face opposed to the discharge stacking portion 113) is defined as a face C, and a lower face of the second portion 62b (face opposed to the discharge stacking portion 113) is defined as a face D. The link pin 4 comes in contact with the face C or the face D of the rail portion 62 of the upper cover member 6. When a force is applied to the scanner 3 to cause the scanner 3 to pivot, the link pin 4 slides with the face C and the face D, and the force is applied from the link portion 32 to the upper cover member 6 through the face C and the face D to cause the upper cover member 6 to pivot. In a cross section orthogonal to the pivotal center axes A and B, the first portion 62a is inclined so as to approach the scanner 3 (shorten the distance from the scanner 3) from the rear side (one end side) on which the pivotal center axes A and B are provided toward the front side (opposite side) opposed to the rear side. In the first embodiment, the first portion 62a is formed so as to be inclined linearly, in other words, to have a plane surface.

The second portion 62b is continuous with the first portion 62a and is substantially parallel to the lower face of the scanner 3, in other words, maintains a constant distance from the lower face of the scanner 3. The regulation portion 62c regulates a moving range of the link pin 4 so as to prevent the link pin 4 from coming off the rail portion 62 and prevent the coupling between the scanner 3 and the upper cover member 6 from being canceled. The above-mentioned abutment portion 61 of the upper cover member 6 is provided on an upper face of the regulation portion 62c.

[Opening and Closing Operation of Scanner and Upper Cover Member]

Figure 3A:
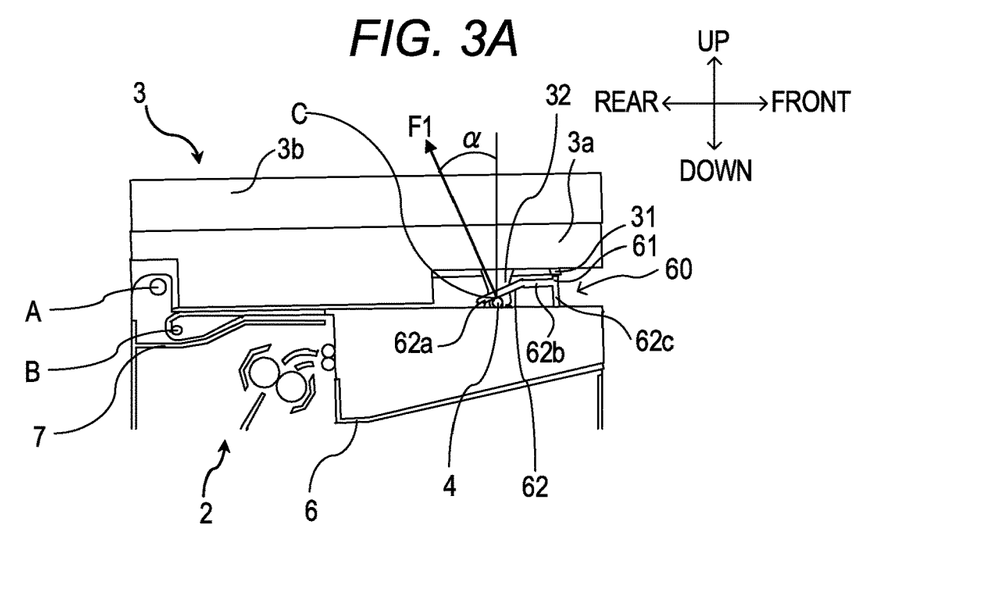
FIG. 3A is a sectional view of the coupling portion in an initial state of an opening operation in the first embodiment.
Figure 3B:
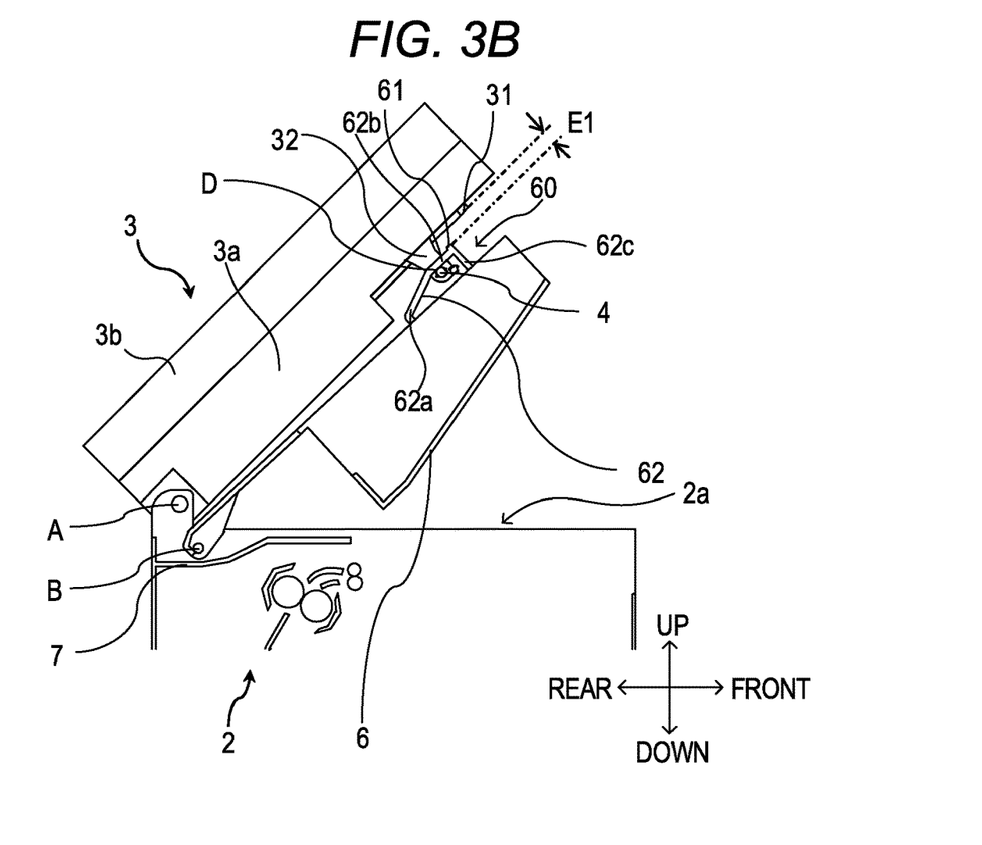
FIG. 3B is a sectional view of the coupling portion in an open state in the first embodiment.

With reference to FIG. 3A and FIG. 3B, an opening and closing operation of the upper cover member 6 in association with the movement of the scanner 3 is described. FIG. 3A is a sectional view for illustrating the coupling portion 60 at a position corresponding to a timing immediately after the scanner 3 is moved upward and caused to pivot (hereinafter also referred to as "at an initial operation"). FIG. 3B is a sectional view for illustrating main parts of the coupling portion 60 in a state in which the scanner 3 is lifted upward and the upper cover member 6 is moved to the open position (during the open state). As illustrated in FIG. 3A, immediately after the scanner 3 is moved upward and caused to pivot, the rail portion 62 and the link pin 4 are brought into abutment against each other on the face C (sliding face) so that the upper cover member 6 starts pivoting in association with the operation of pivoting the scanner 3. At this time, the first portion 62a of the rail portion 62 has a slope shape, and hence a normal force F1 applied to the face C on which the rail portion 62 and the link pin 4 are brought into abutment against each other has an angle α with respect to a tangential direction of the scanner 3 that pivots about the pivotal center axis A. Therefore, a force required when a user lifts the scanner 3 and the upper cover member 6 is F1·cos α.

As illustrated in FIG. 3B, under the state in which the scanner 3 is opened, the second portion 62b of the rail portion 62 and the link pin 4 are brought into abutment against each other on the face D (sliding face). At this time, a gap E1 is defined between the abutment portion 31 of the scanner 3 and the abutment portion 61 of the upper cover member 6. That is, when the upper cover member 6 is in the closed state, the abutment portions 31 of the scanner 3 and the abutment portions 61 of the upper cover member 6 are brought into the open state from the abutment state, thereby defining the gap E1. The gap E1 is an amount determined in accordance with the shape of the rail portion 62 and the distance between the pivotal center axis A and the pivotal center axis B.

As described above, immediately after the start of opening the scanner 3 (at the initial operation), the normal force F1 applied to the face C on which the rail portion 62 and the link pin 4 are brought into abutment against each other has the angle α with respect to the opening and closing direction of the scanner 3. Therefore, the force required for lifting the scanner 3 at the start of opening the scanner 3 is reduced. In particular, a load acting at a position corresponding to the start of opening at which the force required for lifting the scanner 3 is the largest is suppressed, thereby being capable of reducing the force required for lifting the scanner 3. With this, the upper cover member 6 is opened and closed in association with the opening and closing operation of the scanner 3, and thus, even when the weight at the time of lifting the upper cover member 6 together with the scanner 3 is increased, the increase in the force required for lifting the upper cover member 6 together with the scanner 3 is suppressed, thereby being capable of improving usability.

Here, the upper cover member 6 is opened and closed in association with the opening and closing operation of the scanner 3, and thus, a user is not required to directly press and close the upper cover member 6. Therefore, there is a fear in that the upper cover member 6 cannot be securely closed at a predetermined position. In the first embodiment, the rail portion 62 is formed such that the abutment portion 31 of the scanner 3 and the abutment portion 61 of the upper cover member 6 are brought into abutment against each other when the scanner 3 takes the closed position. Therefore, when the scanner 3 takes the closed position, the upper cover member 6 is pressed by the scanner 3 through the abutment portions 31 and is closed, thereby being capable of securely closing the upper cover member 6 at the predetermined position.

In the first embodiment, when the scanner 3 takes the closed position, the abutment portions 31 of the scanner 3 and the abutment portions 61 of the upper cover member 6 are brought into abutment against each other. However, a slight gap may be defined between the abutment portion 31 and the abutment portion 61. In this case, it is only required to set the stopper to be locked, even at a position at which the upper cover member 6 is slightly opened, at the position at which the closed state of the upper cover member 6 is maintained, and draw the upper cover member 6 to the closing side.

As described above, according to the first embodiment, at the time of accessing the inside of the image forming portion, the load acting at the position corresponding to the start of opening at which the force required for lifting the cover member and the image reading portion is the largest is reduced, thereby being capable of improving the usability.

Second Embodiment

A scanner 103, a printer 102, an upper cover member 106, and a coupling portion 160 of a second embodiment are described. The same configurations as those described in the first embodiment are denoted by the same reference symbols, and description thereof are omitted.

[Coupling Structure Between Scanner and Upper Cover Member]

Figure 4A:
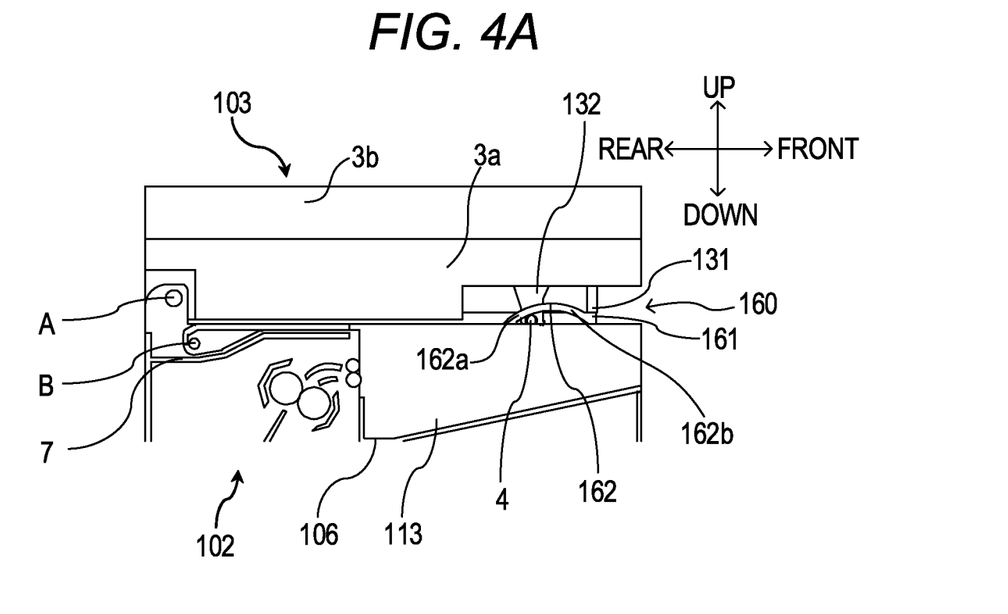
FIG. 4A is a sectional view of a coupling portion in a closed state in a second embodiment.
Figure 4B:
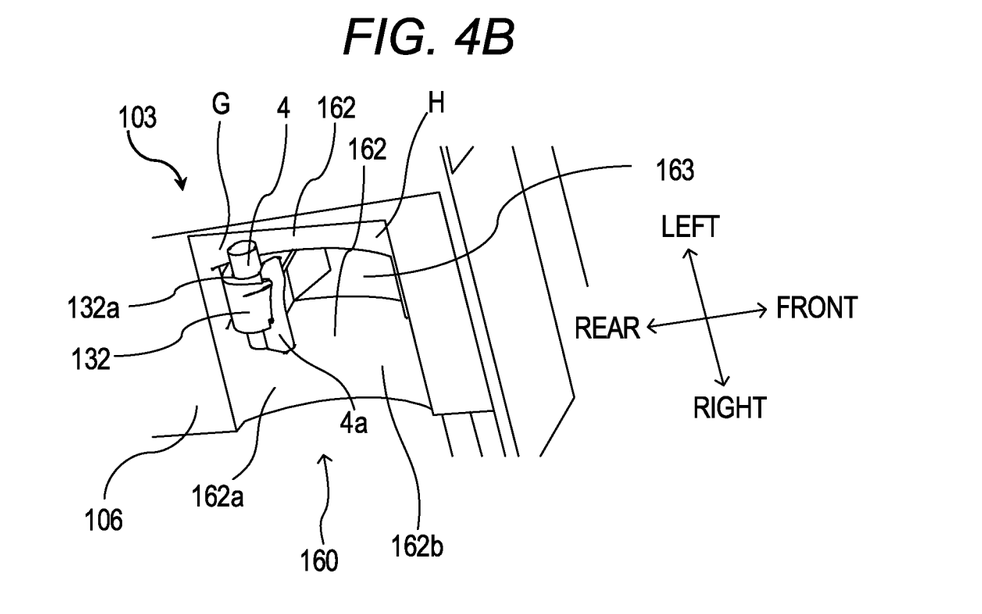
FIG. 4B is a perspective view of the coupling portion in the closed state in the second embodiment.

With reference to FIG. 4A and FIG. 4B, the coupling portions 160 between the scanner 103 and the upper cover member 106 are described. FIG. 4A is a sectional view for illustrating the coupling portion 160 in a closed state in which the scanner 103 takes a closed position, and the upper cover member 106 covers the opening 2a. FIG. 4B is a perspective view for illustrating main parts of the coupling portion 160 during the closed state. In the scanner 103, abutment portions 131 are formed on a lower face of the original table 3a. Meanwhile, abutment portions 161 are formed on an upper face of the upper cover member 106. When the scanner 103 and the upper cover member 106 are in the closed state, the abutment portions 131 of the scanner 103 and the abutment portions 161 of the upper cover member 106 are brought into abutment against each other. Further, similarly to the first embodiment, in the closed state, a stopper (not shown) is brought into a locked state. Therefore, the upper cover member 106 is prevented from being lifted and opened unintentionally during an operation of the multifunction peripheral 1.

The coupling portion 160 includes a link portion 132 and a rail portion 162. The link portion 132 is provided to the scanner 103. The rail portion 162 is provided to the upper cover member 106. The rail portion 162 having a substantially arc cam shape is formed on the upper face of the upper cover member 106, and a hole portion 163 is formed in a part of the rail portion 162. Meanwhile, the link portion 132 having a pin hole portion 132a at a distal end is formed on the lower face of the original table 3a of the scanner 103. The distal end of the link portion 132 of the scanner 103 is inserted through the hole portion 163 formed in the rail portion 162 of the upper cover member 106. The link pin 4 is inserted through the pin hole portion 132a of the link portion 132. The pin regulation portion 4a is fitted to the link portion 132. With this, the scanner 103 and the upper cover member 106 are coupled to each other. The scanner 103 and the upper cover member 106 are coupled to each other by the coupling portions 160, and the upper cover member 106 also pivots in association with an opening and closing operation of the scanner 103.

The rail portion 162 of the upper cover member 106 includes a first portion 162a and a second portion 162b. In a cross section orthogonal to the pivotal center axes A and B, the first portion 162a is inclined so as to approach the scanner 3 (shorten the distance from the scanner 103) from the rear side on which the pivotal center axes A and B are provided toward the front side opposed to the rear side. In the second embodiment, the first portion 162a is formed so as to be inclined in a curved shape, specifically, an arc shape, in other words, to have a curved surface. The second portion 162b is continuous with the first portion 162a, and, in the cross section orthogonal to the pivotal center axes A and B, the second portion 162b is formed so as to be away from the scanner 3 (increase the distance from the scanner 103) from the rear side on which the pivotal center axes A and B are provided toward the front side opposed to the rear side. In the second embodiment, the second portion 162b is formed so as to be inclined in a curved shape, specifically, an arc shape. That is, a lower face of the first portion 162a (face opposed to the discharge stacking portion 113) is defined as a face G (sliding face), and a lower face of the second portion 162b (face opposed to the discharge stacking portion 113) is defined as a face H (sliding face). A portion at which the rail portion 162 is the closest to the upper face of the upper cover member 106 is defined as a boundary between the face G and the face H. Therefore, the link pin 4 is brought into contact with the face G or the face H of the rail portion 162 of the upper cover member 106.

The abutment portion 161 is formed on an upper face of an end portion of the second portion 162b on the front side.

The first portion 162a and the second portion 162b each have an arc shape. Thus, a side (ridge line) being a joint between faces is not present at the boundary portion between an end portion of the first portion 162a on the rear side and an end portion of the second portion 162b on the front side. With this, the link pin 4 slides along the rail portion 162, thereby being capable of moving the scanner 103 and the upper cover member 106 smoothly in association with each other.

[Opening and Closing Operation of Scanner and Upper Cover Member]

Figure 5A:
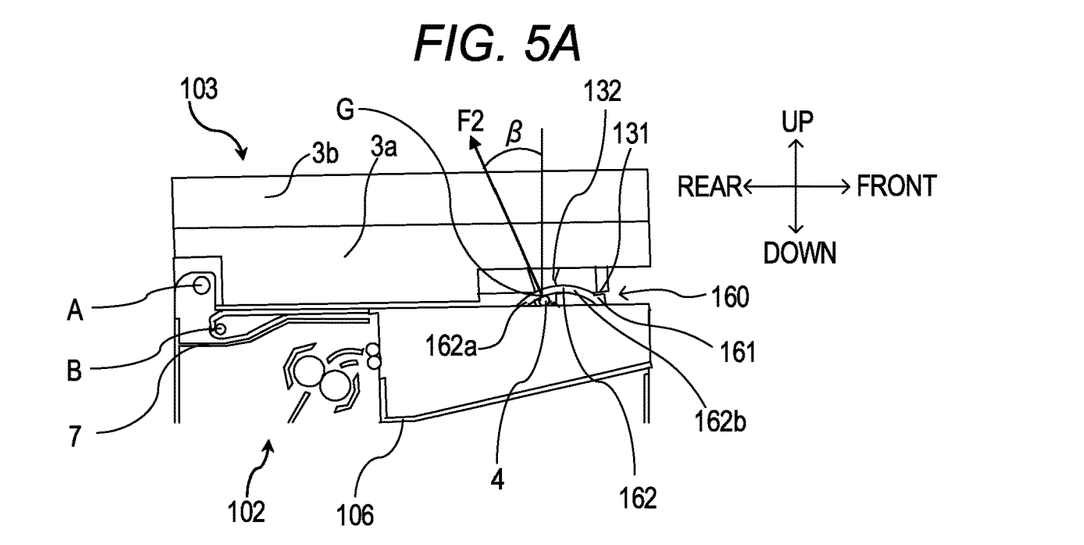
FIG. 5A is a sectional view of the coupling portion in an initial state of an opening operation in the second embodiment.
Figure 5B:
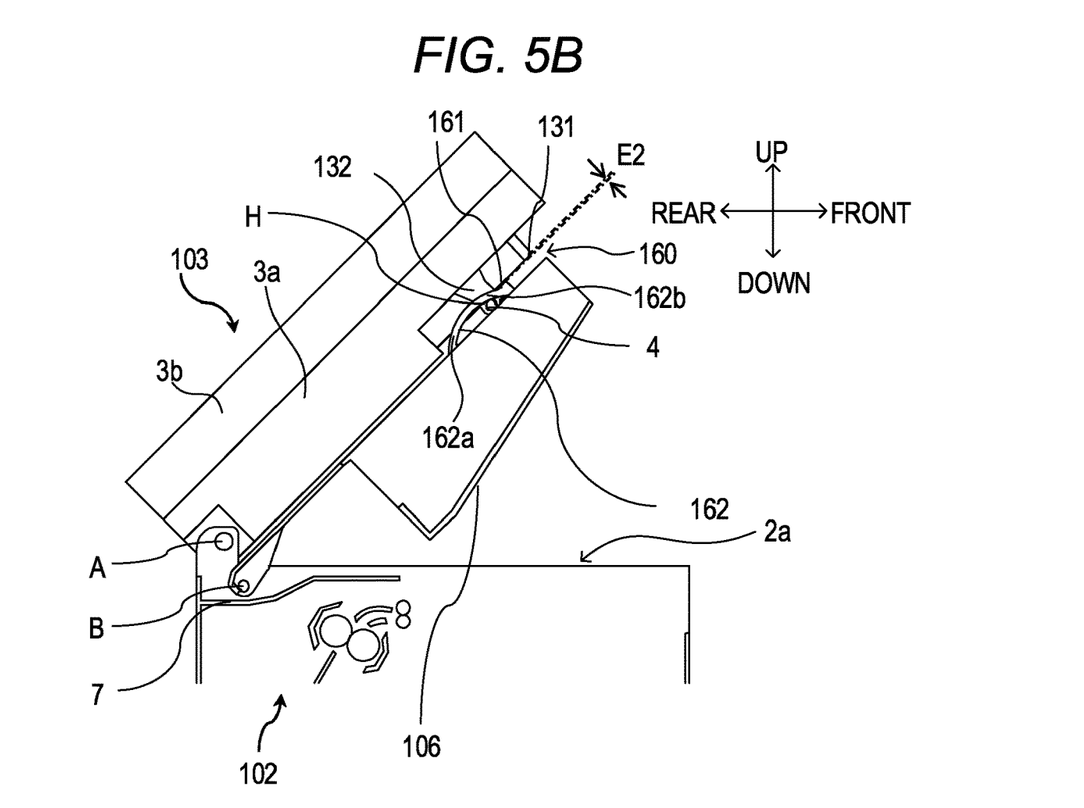
FIG. 5B is a sectional view of the coupling portion in an open state in the second embodiment.

With reference to FIG. 5A and FIG. 5B, an opening and closing operation of the upper cover member 106 in association with the movement of the scanner 103 is described. FIG. 5A is a sectional view for illustrating the coupling portion 160 at a position corresponding to a timing immediately after the scanner 103 is moved upward and caused to pivot (at the initial operation). FIG. 5B is a sectional view for illustrating main parts of the coupling portion 160 in a state in which the scanner 103 is lifted upward and the upper cover member 106 is moved to the open position (during the open state). As illustrated in FIG. 5A, immediately after the scanner 103 is moved upward and caused to pivot, the rail portion 162 and the link pin 4 are brought into abutment against each other on the face G of the first portion 162a so that the upper cover member 106 starts pivoting in association with the operation of pivoting the scanner 103. At this time, the first portion 162a of the rail portion 162 has a substantially arc shape, and hence a normal force F2 applied to the face G on which the rail portion 162 and the link pin 4 are brought into abutment against each other has an angle β with respect to the opening and closing direction of the scanner 103. Therefore, a force required when a user lifts the scanner 103 and the upper cover member 106 is F2·cos β.

As illustrated in FIG. 5B, under the state in which the scanner 103 is opened, the rail portion 162 and the link pin 4 are brought into abutment against each other on the face H of the second portion 162b. At this time, the substantially arc shape of the rail portion 162 is formed such that a slight gap E2 is defined between the abutment portion 131 of the scanner 103 and the abutment portion 161 of the upper cover member 106. As described above, similarly to the first embodiment, immediately after the start of opening the scanner 103 (at the initial operation), the normal force F2 applied to the face G on which the rail portion 162 and the link pin 4 are brought into abutment against each other has the angle β with respect to the tangential direction of the scanner 103 that pivots about the pivotal center axis A. Therefore, the force required for lifting the scanner 103 at the start of opening the scanner 103 is reduced, thereby being capable of improving the usability.

Here, the upper cover member 106 is opened and closed in association with the scanner 103, and thus, a user is not required to directly press and close the upper cover member 106. Therefore, there is a fear in that the upper cover member 106 cannot be securely closed at a predetermined position. Further, regarding the scanner 103, in consideration of the occupied height and the stability of the multifunction peripheral 1, it is preferred to reduce an opening angle of the scanner 103 as much as possible. On the other hand, regarding the upper cover member 106, in consideration of easy accessibility to the inside of the printer 102, it is desired to secure a large opening angle. In the second embodiment, the rail portion 162 is formed into a substantially arc shape, and the substantially arc shape is set such that, when the scanner 103 takes the closed position, the abutment portions 131 of the scanner 103 and the abutment portions 161 of the upper cover member 106 are brought into abutment against each other. On the other hand, the substantially arc shape is set such that, when the scanner 103 takes an open position, the slight gap E2 is defined between the abutment portion 131 of the scanner 103 and the abutment portion 161 of the upper cover member 106. Therefore, when the scanner 103 takes the closed position, the upper cover member 106 is pressed by the scanner 103 and closed, thereby being capable of securely closing the upper cover member 106 at the predetermined position. On the other hand, when the scanner 103 takes the open position, the gap (distance) E2 between the scanner 103 and the upper cover member 106 is substantially the same as that in the positional relationship during the closed state of the scanner 103, and hence the opening angles of the scanner 103 and the upper cover member 106 are substantially equal to each other. With this, for example, access to the process cartridge 101 and jam handling of the sheet P become easier without impairing the occupied height and the stability of the multifunction peripheral 1.

In the second embodiment, when the scanner 103 takes the closed position, the abutment portions 131 of the scanner 103 and the abutment portions 161 of the upper cover member 106 are brought into abutment against each other. However, similarly to the first embodiment, a slight gap may be defined between the abutment portion 131 and the abutment portion 161.

Modification Example

The scanner 103, the printer 102, an upper cover member 206, and a coupling portion 260 as a modification example of the second embodiment are described. The same configurations as those described above are denoted by the same reference symbols, and description thereof are omitted.

[Coupling Structure Between Scanner and Upper Cover Member]

Figure 6A:
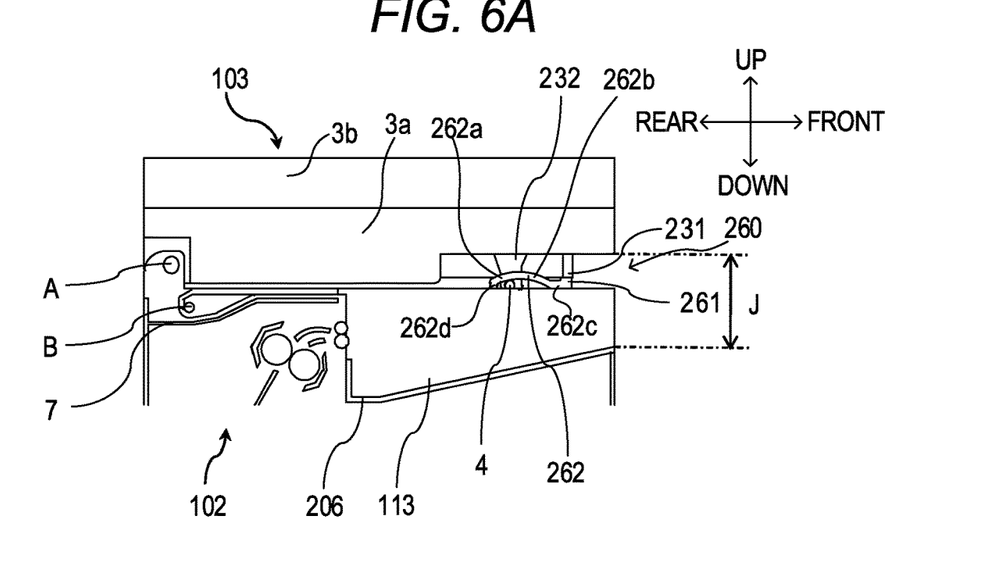
FIG. 6A is a sectional view of a coupling portion in a closed state in a modification example of the second embodiment.
Figure 6B:
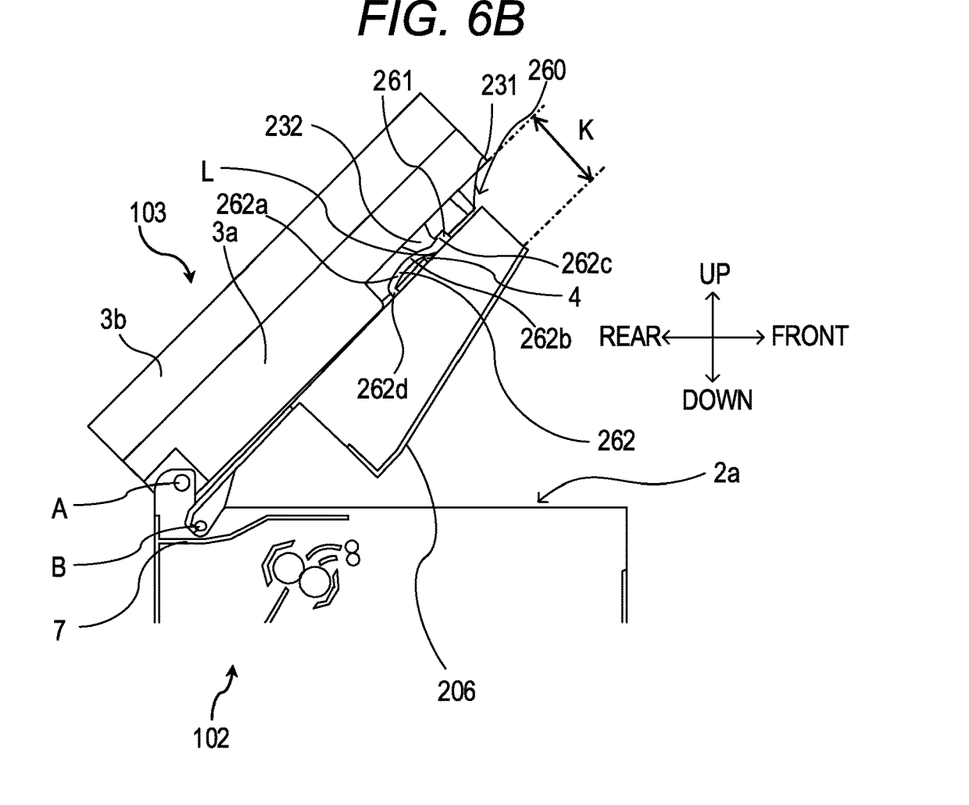
FIG. 6B is a sectional view of the coupling portion in an open state in the modification example of the second embodiment.

With reference to FIG. 6A and FIG. 6B, the coupling portion 260 between the scanner 103 and the upper cover member 206 is described. FIG. 6A is a sectional view for illustrating the coupling portion 260 when the scanner 103 takes a closed position. In the scanner 103, abutment portions 231 are formed on the lower face of the original table 3a. Meanwhile, abutment portions 261 are formed on an upper face of the upper cover member 206. When the scanner 103 and the upper cover member 206 are in the closed state, the abutment portions 231 of the scanner 103 and the abutment portions 261 of the upper cover member 206 are brought into abutment against each other.

The coupling portion 260 includes a link portion 232 and a rail portion 262. The link portion 232 is provided to the scanner 103. The rail portion 262 is provided to the upper cover member 206. The rail portion 262 having a substantially arc cam shape is formed on the upper face of the upper cover member 206. Similarly to the second embodiment, the rail portion 262 has a hole portion (not shown) that allows insertion of a distal end of the link portion 232. Meanwhile, the link portion 232 having a pin hole portion (not shown) at a distal end is formed on the lower face of the original table 3a of the scanner 103. The distal end of the link portion 232 is inserted through the hole portion of the rail portion 262 of the upper cover member 206. The link pin 4 is inserted through the pin hole portion of the link portion 232.

A pin regulation portion (not shown) is fitted to the link portion 232. With this, the scanner 103 and the upper cover member 206 are coupled to each other. The scanner 103 and the upper cover member 206 are coupled to each other by the coupling portions 260, and the upper cover member 206 also pivots in association with the opening and closing operation of the scanner 103.

The rail portion 262 of the upper cover member 206 includes a regulation portion 262d, a first portion 262a, a second portion 262b, and a regulation portion 262c. The first portion 262a is inclined in an arc shape with respect to the upper face of the upper cover member 206. The second portion 262b is inclined in an arc shape to the front side with respect to the first portion 262a. The regulation portion 262c has the abutment portion 261 formed on an upper face thereof. In a cross section orthogonal to the pivotal center axes A and B, the first portion 262a is inclined so as to approach the scanner 3 (shorten the distance from the scanner 103) from the rear side on which the pivotal center axes A and B are provided toward the front side opposed to the rear side. In the cross section orthogonal to the pivotal center axes A and B, the second portion 262b is inclined so as to be away from the scanner 3 (increase the distance from the scanner 103) from the rear side on which the pivotal center axes A and B are provided toward the front side opposed to the rear side. The regulation portion 262c is continuous with the second portion 262b and is formed so as not to form a gap that allows entry of the link pin 4 between the regulation portion 262c and the upper face of the upper cover member 206. In this manner, the regulation portion 262c regulates the moving range of the link pin 4 so as to prevent the link pin 4 from coming off the rail portion 262 and prevent the coupling between the scanner 103 and the upper cover member 206 from being canceled. Here, a distance from the lower face of the original table 3a of the scanner 103 to the discharge stacking portion 113 of the upper cover member 206 on the front side of the multifunction peripheral 1 is defined as a distance J between the scanner 103 and the upper cover member 206.

[Opening and Closing Operation of Scanner and Upper Cover Member]

With reference to FIG. 6B, an opening and closing operation of the scanner 103 and the upper cover member 206 is described. FIG. 6B is a sectional view for illustrating main parts of the coupling portion 260 in a state in which the scanner 103 is lifted upward to bring the upper cover member 6 into the open position. As illustrated in FIG. 6B, under the state in which the scanner 103 is opened, the second portion 262b of the rail portion 262 and the link pin 4 are brought into abutment against each other on a portion L. At this time, a distance between the scanner 103 and the upper cover member 206 is a distance K, and the substantially arc shape of the rail portion 262 is formed such that the distance K is shorter than the distance J (K<J). The fact that the distance K is shorter than the distance J means that an opening angle of the upper cover member 206 (which is also a pivoting angle) is larger than an opening angle of the scanner 103 (which is also a pivoting angle). The coupling portions 260 of the modification example are provided, and hence, even when the angle of pivoting the scanner 103 is not large, the upper cover member 206 can be caused to pivot as much as possible. Thus, access to the inside of the printer 102 becomes easier, and operability is improved.

As described above, also in the modification example, the same effects as those of the second embodiment can be obtained. Further, in the modification example, the substantially arc shape of the rail portion 262 is formed such that the distance between the scanner 103 and the upper cover member 206 is shorter in the state in which the scanner 103 is opened (distance K) than the state in which the scanner 103 is closed (distance J). Therefore, the opening angle of the upper cover member 206 is larger than the opening angle of the scanner 103. With this, for example, access to the process cartridge 101 and jam handling of the sheet P become much easier without impairing the occupied height and the stability of the multifunction peripheral 1.

Regarding the rail portion, for example, the second portion 162b having an arc shape in the second embodiment may be continuous with the first portion 62a that is inclined linearly in the first embodiment, and further the regulation portion 262c in the modification example may be continuous with the second portion 162b. Further, the second portion 62b parallel to the lower face of the scanner 3 and the regulation portion 62c in the first embodiment may be continuous with the first portion 162a having an arc shape in the second embodiment.

As described above, according to the second embodiment and the modification example, at the time of accessing the inside of the image forming portion, the load acting at the position corresponding to the start of opening at which the force required for lifting the cover member and the image reading portion is the largest is reduced, thereby being capable of improving the usability.

According to the first embodiment and the second embodiment, at the time of accessing the inside of the image forming portion, the load acting at the position corresponding to the start of opening at which the force required for lifting the cover member and the image reading portion is the largest is reduced, thereby being capable of improving the usability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-014168, filed Jan. 30, 2020, which is hereby incorporated by reference herein in its entirety.

What is claimed is:

1. An image forming apparatus, comprising:
   an image forming portion, which includes a cartridge, and is configured to form an image on a recording material with developer; and
   an original reading portion, which is provided above the image forming portion, and is pivotable about a first rotation axis,
   wherein the image forming portion includes an opening portion through which the cartridge is removably mounted to the image forming portion from above, and a cover member, which is pivotable about a second rotation axis parallel to the first rotation axis, and is configured to assume an open state in which the opening portion is opened and a closed state in which the opening portion is closed,
   wherein the original reading portion includes an engagement portion, and the cover member includes a sliding face,
   wherein a force is applied to the original reading portion to cause the original reading portion to pivot so that the engagement portion slides on the sliding face to apply a force from the engagement portion to the cover member through the sliding face to cause the cover member to pivot, and wherein the sliding face includes a first portion, and in a cross section orthogonal to the first rotation axis, the first portion approaches the original reading portion from one end side of the image forming apparatus on which the first rotation axis and the second rotation axis are provided toward an opposite side opposed to the one end side.

2. The image forming apparatus according to claim 1, wherein the first portion of the sliding face is a plane surface.

3. The image forming apparatus according to claim 1, wherein the first portion of the sliding face is a curved surface.

4. The image forming apparatus according to claim 1, wherein the sliding face includes a second portion that is continuous with the first portion and maintains a constant distance from a face of the original reading portion opposed to the cover member.

5. The image forming apparatus according to claim 1, wherein the sliding face includes a second portion that is continuous with an end portion of the first portion on a front side, and in a cross section orthogonal to the first rotation axis and the second rotation axis, a distance from the original reading portion to the second portion increases toward the front side.

6. The image forming apparatus according to claim 5, wherein the sliding face includes a regulation portion that is continuous with an end portion of the second portion on the front side and formed so as to prevent a gap that allows entry of the engagement portion between the regulation portion and the cover member from being formed.

7. The image forming apparatus according to claim 6, wherein a distance between the original reading portion and the cover member in the open state is shorter than a distance between the original reading portion and the cover member in the closed state.

8. The image forming apparatus according to claim 4, wherein the original reading portion includes a first abutment portion provided on a lower face of the original reading portion,
   wherein the cover member includes a second abutment portion provided on an upper face of the second portion of the sliding face, and
   wherein the first abutment portion is in abutment against the second abutment portion when the cover member is in the closed state.

9. The image forming apparatus according to claim 6, wherein the original reading portion includes a first abutment portion provided on a lower face of the original reading portion,
   wherein the cover member includes a second abutment portion provided on an upper face of the regulation portion of the sliding face, and
   wherein the first abutment portion is in abutment against the second abutment portion when the cover member is in the closed state.

10. The image forming apparatus according to claim 1, wherein the first rotation axis is provided at a position farther from a front side than the second rotation axis.

11. The image forming apparatus according to claim 1, wherein the cover member includes a discharge portion configured to discharge the recording material on which the image is formed by the image forming portion.

12. The image forming apparatus according to claim 1, wherein the image forming portion is configured to perform monochrome printing.

* * * * *